Sept. 2, 1930.   S. J. FINN   1,774,549
TRIMMING MACHINE
Filed Dec. 22, 1928   2 Sheets-Sheet 1

INVENTOR
Sidney J. Finn
By his Attorney
Nelson Howard

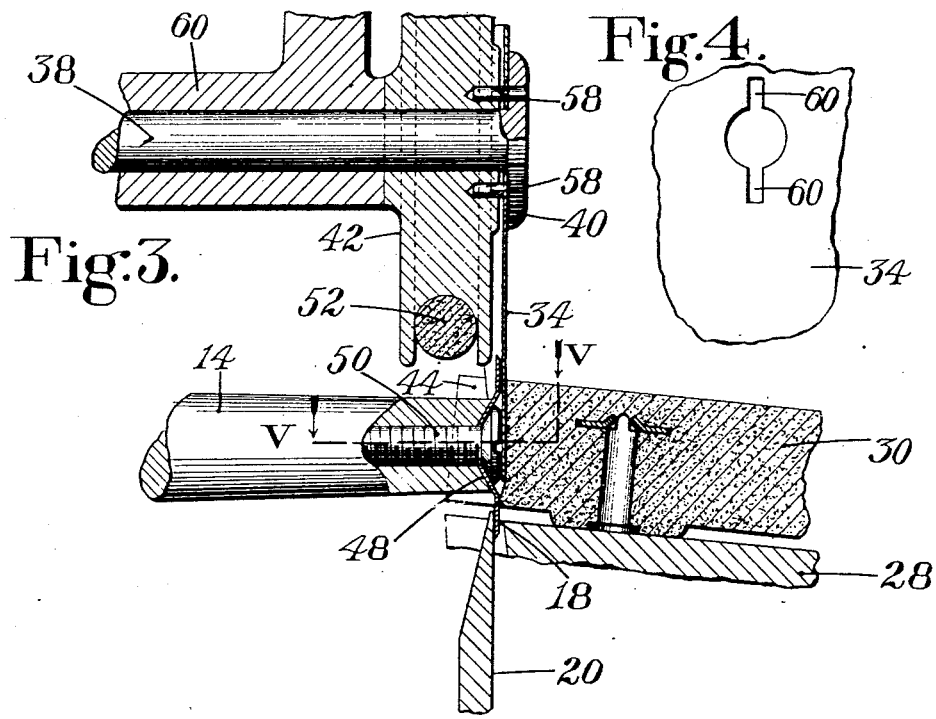

Patented Sept. 2, 1930

1,774,549

UNITED STATES PATENT OFFICE

SIDNEY J. FINN, OF BEVERLY, MASSACHUSETTS, ASSIGNOR TO UNITED SHOE MACHINERY CORPORATION, OF PATERSON, NEW JERSEY, A CORPORATION OF NEW JERSEY

TRIMMING MACHINE

Application filed December 22, 1928. Serial No. 327,795.

This invention relates to trimming machines and is herein illustrated as embodied in a machine designed especially for trimming fins of overflow from molded rubber articles.

A type of machine now used extensively for trimming fins of overflow from molded rubber articles, for example, soles and heels, comprises a pair of cutters arranged to cooperate in shearing relation, and a table on which the articles of work may be fed past the cutters. In machines for performing an operation of the character mentioned it is common to provide a gage arranged to guard the bodies of the molded articles from attack by the cutting edges of the cutters. Nevertheless, even when such gages are used considerable expertness on the part of the operators is required to manipulate and feed the articles of work in a manner such as to obtain flush trimming without cutting or nicking the bodies of the articles. This is more particularly so with regard to trimming overflow from incurved surfaces as contrasted with flat or outcurved surfaces, since some portion of an incurved surface necessarily intersects the plane of the cut.

With the foregoing considerations in view an object of the present invention is to provide a trimming machine of the type referred to with improved work-guiding means that will not only permit flush trimming of overflow on incurved surfaces as well as on straight and outcurved surfaces but will also insure against cutting or nicking such surfaces whatever their shape may be.

To this end a feature of the invention consists in a novel combination comprising a trimming gage having a thin flexible work-engaging portion relatively to which an article of work may be fed while in contact therewith, means by which the gage is supported so that its work-engaging portion may be flexed to conform to curved surfaces of articles of work by light pressure of such surfaces against it, and trimming mechanism arranged to sever surplus material projecting from the guiding surface of the work past an edge of the gage. As herein illustrated the above-mentioned flexible gage is supported so that it will be free to oscillate within certain limits according to the demands of the work and to the manner in which the work is manipulated.

In machines for performing trimming operations of the kind above referred to the coefficient of friction between molded rubber articles and the work table has a retarding effect on production. For this reason it is common to provide trimming machines for doing this work with driven means for acting frictionally on the articles of work to assist the operators in feeding the articles past the trimming cutters. With regard to this consideration a further object of the invention is to provide improved feeding means of the friction type that will operate more effectively than the feeding devices heretofore provided.

Accordingly, another feature of the invention consists in a novel combination comprising trimming means and a flexible rotary feeding disk arranged to act on the surface of the work confronting the trimming means and adapted, by reason of its flexibility, to conform to surfaces of various shapes, for example, flat surfaces and incurved surfaces of various degrees of curvature. This flexible feeding disk and the aforesaid flexible resilient gage may conveniently be the same element, and the invention is so illustrated. Thus, when the active surface of the feeding disk is flexed to conform to an incurved surface of an article of work pressed against it these two surfaces have a considerable area of contact with each other, and since the disk is driven its frictional feeding effort will counteract, and in many cases be superior to, the retarding effect of the work table.

When, as in the illustrated construction, flexibility of a rotary feeding disk is a desirable condition, it involves the problem of mounting and driving the disk without constraining it against flexure. Accordingly, still another feature of the invention consists in an improved combination comprising a flexible feeding disk and driven means by which the disk is supported and rotated, the connection between the disk and the driven means being articulated and loose to avoid constraining the disk against flexure and free motion within certain limits.

Although the flexible disk is described with particular regard to its usefulness in respect to incurved surfaces of the work, it will be understood that, as above indicated, its gaging and feeding functions have utility also with regard to flat surfaces and outcurved surfaces of articles of work.

Referring to the drawings,

Fig. 3 is a vertical section on an enlarged scale through the trimming mechanism, a portion of a rubber heel being represented as in process of being trimmed;

Fig. 4 is a front elevation of a portion of a thin flexible disk included in Fig. 3;

Fig. 5 represents a top plan view, partly in section as indicated by line V—V of Fig. 3, of a molded rubber heel in process of being trimmed;

Fig. 6 is a top plan view of one of the trimming cutters, the trimming gage and a portion of an article of work, the scale of the figure being about twice as large as that of Fig. 3.

Figure 1:
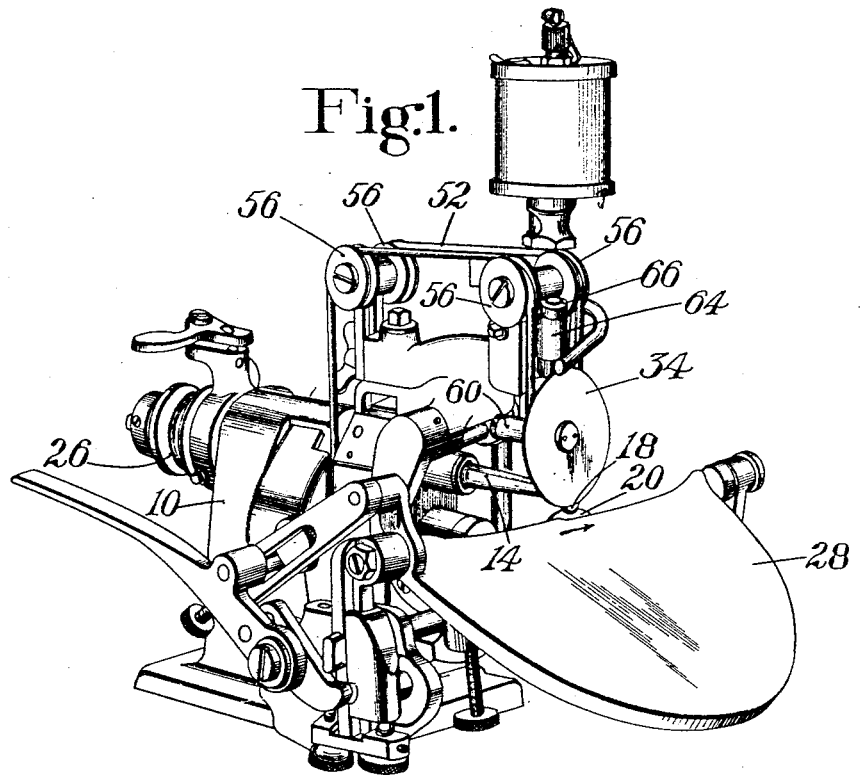
Fig. 1 is a perspective view of a trimming machine embodying the novel features of this invention.

The general organization of the machine herein illustrated is similar, with some exceptions, to that illustrated in United States Letters Patent 1,682,780, granted September 4, 1928, on an application filed in my name. The main frame 10 of the machine is provided with bearing portions 12 in which two parallel cutter shafts 14 and 16 are journaled, one above the other. Two rotary disk cutters 18 and 20 are affixed to the cutter shafts respectively and are arranged in lapped relation to cooperate with a shearing action. The upper cutter 18 is preferably arranged in front of the cutter 20 to facilitate flush trimming of fins of overflow projecting from molded rubber articles such as soles and heels. A pinion 22 formed on the shaft 14 meshes with a gear 24 affixed to the shaft 16 to cause the shafts to rotate in opposite directions. Any suitable means may be provided to drive the shafts, Fig. 1, including a pulley 26 mounted on the shaft 14 to receive rotation from a belt (not shown).

It is common to provide machines of the type illustrated with work-supporting tables such as that indicated at 28 and to incline them more or less as may be necessary to permit the cutters 18 and 20 to sever fins of overflow so that no portions of the fins will remain after the trimming has been completed.

Figs. 3 and 5 illustrate a well-known type of rubber heel the body 30 of which is formed in a mold. Incidental to molding such articles, thin fins 32 of overflow are formed thereon. Consequently, after the molded articles are removed from the molds it becomes necessary to sever these fins of overflow, and it is desirable to sever them flush with the molded bodies without cutting into the bodies. In trimming fins of overflow from molded rubber heels and soles, it has been the practice to place the article of work upon the work supporting table and to feed the article manually past the trimming means, but to guard against cutting into the bodies of the molded articles it is customary to provide machines for this purpose with trimming gages of one type or another arranged to be engaged by those faces of the molded articles from which the fins of overflow project. For this purpose the present invention provides an improved trimming gage having a flexible resilient work-engaging portion capable of conforming to various degrees of curvature of the surfaces of molded articles brought to bear against it.

Figure 2:
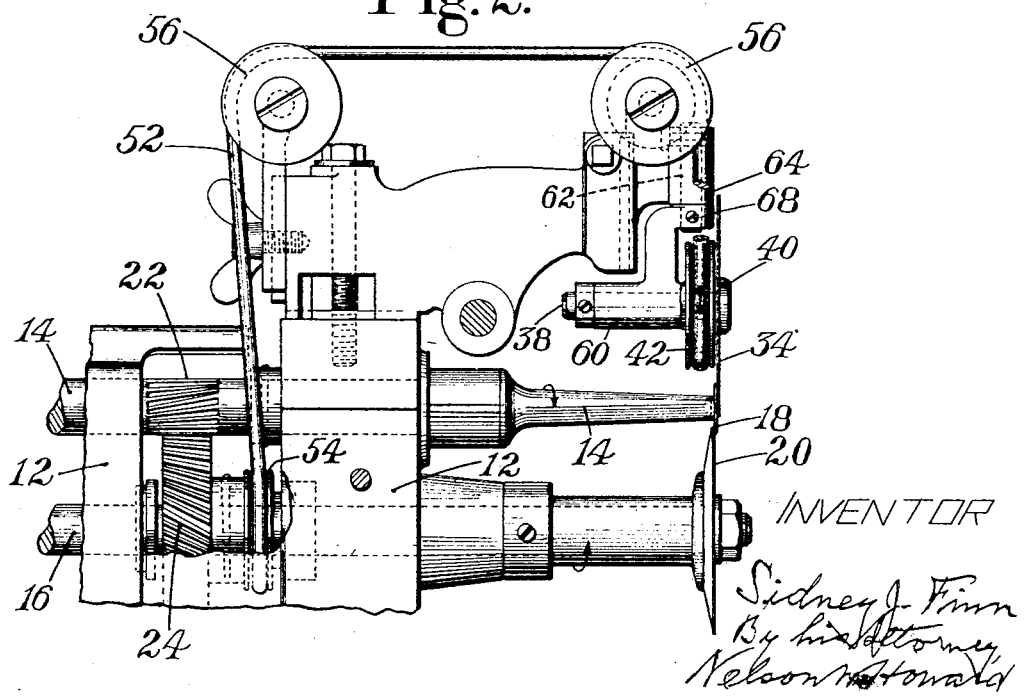
Fig. 2 is an elevation of a portion of said machine.

The trimming gage herein illustrated is a thin circular disk 34 of spring steel, normally flat and having a smooth rounded outer edge. It is larger than the cutter 18 and is arranged to extend across the outer face 36 of that cutter so that it covers nearly all of that face, a small segment of the cutter projecting below the lower edge of the gage, as shown in Figs. 1 and 2, to enable the cutter to sever a fin of overflow inserted under the gage. The gage 34 is so thin that a slight inclination of the work-supporting table 28 (see Fig. 3) is sufficient to permit the root of the fin of overflow to lie in the plane of the cut, and the cutters are therefore enabled to sever the fin flush with the body 30 of a molded article without cutting into the body.

As shown in Fig. 3, the gage 34 is mounted on a shaft 38 arranged above the cutter shaft 14 and approximately parallel thereto. The gage is retained on the shaft by a flange or head 40 formed on the front end of the shaft. The shaft also supports a pulley 42 arranged behind the gage but the head 40 is spaced from the pulley a distance greater than the thickness of the gage to provide a loose connection and thereby to avoid constraining the gage against flexure. The work-engaging portion of the gage projects laterally beyond the cutter 18 so that when an incurved surface of a molded article, for example, an incurved breast surface such as that indicated at 44 in Fig. 5, is brought to bear against the gage the middle zone as well as the marginal portions of the gage will undergo diametrical flexure imparted by that surface. Such flexure of the gage is represented in Figs. 3, 5 and 6.

It is to be observed that the outer face 36 of the cutter 18 projects from the plane of the cutting edge 46 thereof so that even when the gage 34 is flexed to intersect that plane, indicated by broken line $a$ in Fig. 6 no part of the gage can contact with the cutting edge. Thus, although the gage may be pressed against the outer face 36 of the cutter it can not in any case dull the cutting edge thereof, since the cutting edge is not at that face.

To permit the gage to contact with the front face of the cutter, the central portion 48 of the cutter is counter-sunk (see Figs. 3 and 5) to provide a cavity as deep as the head of the screw 50 by which the cutter is affixed to its shaft 14. The gage 34 will preferably be mounted so that normally it will barely clear the front face 36 of the cutter 18, but since the gage is loosely connected to its supporting means so that it may wabble, any slight initial clearance between the gage and the cutter may be eliminated by a negligible pressure of the article of work against the gage.

In Fig. 1, an arrow indicates the preferred direction in which the work should be fed while the trimming is in progress, the cutters 18 and 20 being rotated in directions such as to exercise a frictional feeding effort in the direction of the arrow. On the other hand, since the cutter 18 penetrates and intersects the material to be severed it counteracts, to some extent, the aforesaid frictional feeding effort of the cutters, and it is therefore desirable to provide supplemental work-feeding means by which to speed up the feeding of the work and thereby promote rapid production of the trimmed articles. With this object in view, the gage 34 is utilized for the additional purpose of exercising a frictional feeding action on the work to supplement that of the cutters. Accordingly, the gage 34 is rotated in a direction consistent with the arrow in Fig. 1, and for this purpose the shaft 38 (Fig. 3) is driven and a suitable driving connection is formed between the shaft and the gage.

In the illustrated machine, a belt 52 driven by a pulley 54 on the cutter shaft 16 runs over sheaves 56 and around the pulley 42 on the shaft 38. Two driving pins 58 (Fig. 3) affixed to the head 40 of the shaft 38 project into sockets formed in the hub of the driven pulley 42. These pins are at diametrically opposite points with reference to the shaft 38 and they extend through notches 60 (Fig. 4) formed in the gage 34 to provide an articulated driving connection by which the gage may be rotated without impairing its freedom of flexure or its freedom to wabble as hereinbefore pointed out.

Referring to Fig. 2, the shaft 38 is journaled in a bracket 60 supported above the cutter shaft 14. This bracket is preferably swiveled so that it may have a limited range of oscillation about an axis transverse to the axis of the shaft 38. As shown, the bracket 60 is provided with a vertical stem 62 that extends through a stationary support 64, the upper end of the stem being provided with a supporting head 66 and the lower end being detachably secured in the bracket by a setscrew 68. This construction is such that the disk 34 may oscillate slightly about the axis of the stem 62 in response to demands caused by manipulation of the work while the trimming is in progress.

Referring to Fig. 1, it will be observed that the center of the disk 34 is located a short distance to the left of a vertical plane parallel to and intersecting the axes of the cutters. As a result of this relation the vertical diameter of the disk 34 is placed in register with the cutting point at which the cutting edges of the cutters 18 and 20 cross each other.

When a molded rubber heel such as that illustrated in Figs. 3 and 5 is being trimmed a moderate pressure of the breast surface 44 of the heel against the disk 34 will be sufficient to flex the disk 34 to conform to the curvature of the breast surface. Under these conditions the cutter 18 engages and braces a confronting portion of the disk 34 and thus cooperates with the curved surface 44 of the work to flex the disk. Thus, even though the trailing portion of the breast surface and the corresponding portion of the disk 34 may intersect the shearing plane, the breast surface will be guided across the shearing plane as it approaches the cutter 18 and will be guarded aginst attack by the cutting edge 46.

Moreover, the curved breast surface 44 will have an elongated area of contact with the confronting face of the disk 34 in consequence of the conforming flexure imparted to the disk as above explained. The extensive area of contact thus developed between the disk 34 and the breast surface 44 exerts a considerable frictional feeding effort on the heel which is particularly advantageous when operating on incurved surfaces, since it relieves the operator of the necessity of exercising a manual feeding effort in addition to the manual effort required to flex the disk.

When the convex peripheral surface 70 of the heel is presented to the disk 34 the latter will remain in its normal flat condition although here again it will be pressed against and braced by the outer face of the cutter 18, and will not only exercise a feeding action on the surface 70 but will also guard that surface against attack by the cutter. Again, when a flat surface of an article of work is presented to the disk 34, for example a flat heel breast, the disk will feed and guard the heel as above described.

Having thus described my invention, what I claim as new and desire to secure by Letters Patent of the United States is:

1. A trimming machine comprising a gage having a thin, flexible and resilient work-engaging portion relatively to which an article of work may be fed while in contact therewith, means by which said gage is supported so that said work-engaging portion may be flexed to conform to curved surfaces of articles of work by pressure of such surfaces against it, and trimming mechanism arranged to sever surplus material projecting from the work past an edge of said work-engaging portion.

2. A trimming machine comprising a gage having a normally flat work-engaging portion of thin, flexible and resilient material relatively to which an article of work may be fed while in contact therewith, means by which said gage is supported so that said work-engaging portion may be flexed to conform to incurved surfaces of articles of work by pressure of such surfaces against it, and trimming mechanism arranged to sever surplus material projecting from the work past an edge of said work-engaging portion.

3. A trimming machine comprising trimming mechanism arranged to sever surplus material projecting from an article of work fed relatively thereto, work-supporting means cooperatively related to said trimming mechanism, a trimming gage having a flexible resilient work-engaging portion arranged to guide the work relatively to said trimming mechanism, and means by which said gage is loosely supported in front of said trimming mechanism so that said work-engaging portion may be pressed against the latter and flexed to conform to curved surfaces of articles of work by pressure of such surfaces against it.

4. A trimming machine comprising a rotary trimming cutter having a circular cutting edge and a front face projecting from the plane of said edge, a trimming gage having a flexible resilient work-engaging portion arranged to engage said front face of the cutter and to project laterally beyond said cutter, and means by which said gage is supported so that said work-engaging portion may be flexed to conform to incurved surfaces of articles of work by pressure of such surfaces against it.

5. A trimming machine comprising a trimming cutter, a trimming gage having a thin flexible work-engaging portion extending across a face of the cutter and projecting laterally beyond the cutter, and means by which the gage is supported so that said work-engaging portion may be flexed to conform to an incurved surface of an article of work pressed against it, said cutter being arranged to engage and brace the confronting face of said work-engaging portion and thereby cooperate with such incurved surface of the work to impart flexure to said work-engaging portion.

6. A trimming machine comprising a trimming cutter, a thin, flexible and resilient trimming gage arranged to extend across the front of the cutter to engage a face of an article of work, and means by which said gage is mounted so that it may be flexed to conform to incurved surfaces of articles of work by pressure of such surfaces against it, said means also having provision for permitting the gage to oscillate according to the demands caused by manipulation of the work.

7. A trimming machine comprising a trimming cutter, a thin rotary disk arranged to extend across the front of the cutter to engage a face of an article of work presented to the cutter, means by which said disk is mounted so that it may oscillate otherwise than about its axis of rotation to meet the demands caused by manipulation of the work, and means for driving said disk to feed the work.

8. A trimming machine comprising a trimming cutter, a thin, flexible and resilient disk arranged to extend across the front of the cutter to engage a face of an article of work presented to the cutter, means by which said disk is mounted to rotate and to be flexed by incurved surfaces of articles of work pressed against it, and means for driving said disk to feed the work.

9. A trimming machine comprising a trimming cutter, a circular disk arranged to extend across the front of the cutter to engage a face of an article of work presented to the cutter, and rotary driven means by which said disk is supported and rotated to feed the work, said disk and said means having an articulated driving connection by which the disk is permitted to wabble to a limited extent relatively to said supporting means.

10. A trimming machine comprising a trimming cutter, a circular disk arranged to extend across the front of the cutter to engage a face of an article of work presented to the cutter, a driven shaft by which said disk is supported and rotated to feed the work, and a swiveled bearing member in which said shaft is journaled so that said disk may oscillate about an axis transverse of its axis of rotation in response to demands caused by manipulation of the work.

11. A trimming machine comprising a trimming cutter, a thin circular disk of resilient material arranged to extend across the front of the cutter to engage a face of an article of work presented to the cutter, and rotary driven means by which the disk is supported and rotated to feed the work, the connection between the disk and the driven means being articulated and loose to avoid constraining the disk against flexure when an incurved surface of the work is pressed against the disk.

12. A trimming machine comprising a trimming cutter, a thin circular disk of resilient material arranged to extend across the front of the cutter to engage a face of an article of work presented to the cutter, rotary driven means by which the disk is supported and rotated to feed the work, the connection between the disk and the driven means being articulated and loose to avoid constraining the disk against flexure when an incurved surface of the work is pressed against the disk, and a swiveled bearing member in which said shaft is journaled and by which the shaft and said disk are afforded freedom to oscillate about an axis transverse to the axis of the shaft.

13. A trimming machine comprising a pair of cutters arranged in shearing relation to sever a fin of overflow from a molded rubber article, a trimming gage having a thin and flexible but normally flat work-engaging portion extending across and in contiguous relation to the outer face of one of said cutters, and means by which said gage is supported so that said work-engaging portion may be flexed to intersect the shearing plane of the cutters by pressure of an incurved surface of an article of work against the work-engaging portion.

14. A trimming machine comprising trimming mechanism constructed and arranged to sever a fin of overflow projecting from a molded rubber article, a thin, flexible, circular gage rotatably mounted to guide an article of work past the trimming locality by engagement with that surface of the work from which the overflow projects to the trimming locality, and means for rotating said gage to feed the work frictionally.

15. A trimming machine comprising a pair of cutters arranged in shearing relation to sever a fin of overflow projecting from a molded rubber article, a thin, flexible, circular trimming gage, and rotatable driven means by which said gage is mounted in lapped, confronting relation to one of said cutters to guide an article of work past the trimming locality by engagement with that surface of the work from which the overflow projects across the shearing plane of the cutters, a portion of said gage being arranged to be flexed across the shearing plane by pressure of an incurved surface of an article of work held against it.

In testimony whereof I have signed my name to this specification.

SIDNEY J. FINN.